United States Patent
Toyama et al.

(10) Patent No.: US 7,603,621 B2
(45) Date of Patent: Oct. 13, 2009

(54) COMPUTER INTERFACE FOR ILLITERATE AND NEAR-ILLITERATE USERS

(75) Inventors: Kentaro Toyama, Bangalore (IN); Aman Sagar, New Delhi (IN); Indrani Medhi, Guwahati (IN)

(73) Assignee: Microsoft Corporation, Redmond, WA (US)

( * ) Notice: Subject to any disclaimer, the term of this patent is extended or adjusted under 35 U.S.C. 154(b) by 102 days.

(21) Appl. No.: 11/340,288

(22) Filed: Jan. 25, 2006

(65) Prior Publication Data

US 2008/0040693 A1   Feb. 14, 2008

(51) Int. Cl.
G06F 3/00 (2006.01)

(52) U.S. Cl. .................. 715/707; 715/865; 715/963; 705/9; 705/10; 705/14

(58) Field of Classification Search .......... 715/707, 715/865, 963; 705/9, 10, 14
See application file for complete search history.

(56) References Cited

U.S. PATENT DOCUMENTS

| | | | | |
|---|---|---|---|---|
| 4,914,605 A * | 4/1990 | Loughmiller et al. | ....... | 345/649 |
| 5,579,057 A * | 11/1996 | Banker et al. | ............... | 348/589 |
| 5,730,720 A * | 3/1998 | Sites et al. | .................... | 604/27 |
| 5,963,964 A * | 10/1999 | Nielsen | ....................... | 715/255 |
| 6,072,482 A * | 6/2000 | Moon et al. | ................. | 715/866 |
| 6,421,066 B1 * | 7/2002 | Sivan | .......................... | 715/712 |
| 6,628,307 B1 * | 9/2003 | Fair | ........................... | 715/763 |
| 6,930,685 B1 * | 8/2005 | Sakagawa et al. | ........... | 345/426 |
| 7,020,848 B2 * | 3/2006 | Rosenzweig et al. | ........ | 715/855 |
| 7,243,024 B2 * | 7/2007 | Endicott | ...................... | 701/206 |
| 2001/0042001 A1 * | 11/2001 | Goto et al. | ..................... | 705/9 |
| 2003/0025724 A1 * | 2/2003 | Ullmann et al. | ............. | 345/707 |
| 2004/0107127 A1 * | 6/2004 | Kanzinger et al. | ............ | 705/9 |
| 2005/0125408 A1 * | 6/2005 | Somaroo et al. | ............. | 707/10 |
| 2005/0268254 A1 * | 12/2005 | Abramson et al. | .......... | 715/855 |
| 2005/0272413 A1 * | 12/2005 | Bourne | ....................... | 455/415 |
| 2006/0008123 A1 * | 1/2006 | Sweeney | ..................... | 382/114 |
| 2006/0010468 A1 * | 1/2006 | Loughridge | .................. | 725/38 |
| 2006/0122838 A1 * | 6/2006 | Schindler et al. | ............ | 704/271 |
| 2006/0173614 A1 * | 8/2006 | Nomura | ...................... | 701/210 |

(Continued)

OTHER PUBLICATIONS

Chand, "Designing for Indian Rural Population; Interaction Design Challenges," Development by Design, Bangalore, India, 2002, 4 pages.

(Continued)

*Primary Examiner*—Kieu Vu
*Assistant Examiner*—Patrick F Riegler
(74) *Attorney, Agent, or Firm*—Klarquist Sparkman, LLP

(57) ABSTRACT

An interface is presented that can be used by those with little or no computer skills and little or no reading skills. In an exemplary embodiment, the icon pictures are detailed enough that they do not need text to be understood. Most icons do not require that they be clicked to be selected, rather they select on cursor hover. When an icon is hovered over, in an exemplary embodiment, it increases in size to make it easier for a user to select it. The interface has a help function that provides a voice that tells the function of an icon when the icon is moused over or otherwise tentatively chosen by a user. The help function voice may be accompanied by a virtual companion—a picture of a person, who, in some embodiments, is animated and appears to be speaking the help text.

18 Claims, 9 Drawing Sheets

U.S. PATENT DOCUMENTS

2007/0203642 A1* 8/2007 Arnold-Huyser ............ 701/211

OTHER PUBLICATIONS

Foltz et al., "Query by Attention: Visually Searchable Information Maps," Proc. of Fifth International Conf. on Information Visualization, 2001, 9 pages.

Ghosh et al., "Design Considerations for a Financial Management System for Rural, Semi-literate Users," ACM Conference on Computer-Human Interaction (CHI '03), 2003, 2 pages.

Huenerfauth, "Design Approaches for Developing User-Interfaces Accessible to Illiterate Users," AAAI Technical Report WS-02-08, 2002, 9 pages.

Medhi et al., "A Text-Free User Interface for Employment Search," Proceedings of the $3^{rd}$ Asian Applied Computing Conference (AACC 2005), Nepal, Dec. 10-12, 2005, 6 pages.

Mitra, "Self organising systems for mass computer literacy: Findings from the 'hole in the wall' experiments," International Journal of Development Issues, vol. 4, No. 1, Jun. 2005, pp. 71-81.

Noronha, "Giving Micro-Finance the IT Edge," *Express Computer*, Jul. 1, 2002, 3 pages.

Parikh et al., "Design Studies for a Financial Management System for Micro-Credit Groups in Rural India," *CUU'03*, Vancouver, British Columbia, Canada, Nov. 10-11, 2003, 8 pages.

* cited by examiner

Software 980 Implementing Interfaces for
Illiterate or Near-Illiterate Users

COMPUTER INTERFACE FOR ILLITERATE AND NEAR-ILLITERATE USERS

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

BACKGROUND

Most computer applications pose an accessibility barrier to those who are unable to read fluently. The heavy use of text on everything from menus and help functions to the actual document content itself severely limits the ability of those who are illiterate or semi-illiterate to access functions and services implemented on a computer.

Graphical user interfaces (GUI's) have been developed to make computer systems easy to use without users needing to remember complex commands. These GUI's typically start with a desktop, which is a visual screen area upon which different graphical objects, such as icons, windows and menus, can be displayed. An icon is a small graphic symbol, often with accompanying text, which causes something to happen when selected. Menus provide the same functionality as icons, but can present many more options to the user as multiple menus often exist on a menu bar (usually located on the edge of a desktop window) with each individual menu opening up into many separate choices. However, menus signal their functions using text. For example, the common "File" menu has commands such as "Open", "Save" and "Print", all of which might also be represented with icons on the desktop.

Various pointing devices are used to select the different GUI objects. Examples of common pointing devices are computer mice, styluses, and touch screens. Typically, a user selects a graphical object by positioning a cursor associated with the pointing device over the object and then clicking a mouse button, tapping a stylus, tapping the screen, or otherwise indicating that such an object should be selected. When the cursor is positioned over the object, the object indicates that it is selectable by changing color, changing shape, etc.

These basic computer concepts can be difficult for new users to understand. If these new users are illiterate, or speak a language different than that shown on the desktop, the difficulties are compounded. As an example of such difficulty, using a computer mouse, which seems intuitive to those who have grown up with such devices, presents quite a challenge to new computer users from backgrounds where computers, let alone computer mice, are scarce. People that are not familiar with computers can have difficulty understanding the translation of the horizontal mouse path to the vertical computer screen. Furthermore, the concept that icons are selectable, and that they represent actions that can be taken by the computer is far from clear. Also, selecting an icon by pressing a mouse button or tapping on the icon using a stylus or a finger is far from intuitive.

More difficulties arise when maps are presented on a computer to a target population that is either illiterate or cannot read the language on the map. Maps are powerful tools that allow people to answer complex questions that have a geographical dimension. The philosopher Alford Korzybski stated, "A map is not the territory it represents, but if correct, it has a similar structure to the territory, which accounts for its usefulness". There's the rub, of course. An abstraction that compresses the real world into map form can create a barrier to understanding the actual territory the map is designed to represent.

When a map is reproduced on a computer, another layer of potential misunderstanding is raised, as users must also understand the basics of operating a computer before being able to extract knowledge from the map. If the population that is attempting to navigate by way of the map is also unfamiliar with the idea of maps in general, the difficulties are then compounded.

Therefore, it would be helpful to have computer interfaces that do not require reading, and that are simple to use for a novice computer user.

SUMMARY

In an exemplary embodiment, a method is provided which allows user interaction with an interface with minimal or no text labels. The method can be broken down into those features which are designed for illiterate users and those which are designed for illiterate users who are also novice computer users.

For illiterate users, the method presents a subset of the following features: semi-abstracted graphical icons for all controls (user-interface elements) with action cues for representations of verbs, voice feedback on all controls, a consistent help feature that plays instructions and background information for users (via audio or video), optional use of numbers (as many illiterate users can nevertheless read numbers), and a visual filtering mechanism whereby relevant controls visually highlight when a control representing their category is selected or moused over.

As people who do not read or write still generally understand the directional conventions of the language, ordered information, such as job listing information, is ordered on the screen using the language conventions or by using arrows to indicate the direction that the information should be "read." In systems that allow the language to be changed, in some embodiments, the ordering of the information is also changed to follow the ordering conventions of the new language.

When selected, or to indicate that they can be selected, icons can undergo some change, such as becoming enlarged, being animated, changing their border, and so on. When an icon is selected, similar icons may also automatically be selected. They may also indicate this selection by some sort of modification, such as, in an exemplary map embodiment, displaying actual pictures of a location that they represent.

In an exemplary embodiment, a virtual companion is provided, in part, at least, to give a friendlier feel to the computer-human interaction. The virtual companion may be animated, and may appear to be speaking the help messages. For illiterate novice users, the method further presents a subset of the following features: activation of controls on mouse hover (rather than mouse click), advanced features through mouse click. In an exemplary embodiment, a short video where actors role-play the scenarios that the application can be applied to is shown as an introduction.

This summary is provided to introduce a selection of concepts in a simplified form that are further described below in the Detailed Description section. This summary does not identify required or essential features of the claimed subject matter.

Additional features and advantages will become apparent from the following detailed description of illustrated embodiments, which proceeds with reference to accompanying drawings.

DETAILED DESCRIPTION

I. Overview

Systems and methods are presented herein for a user interface that can be used to allow people with minimal reading skills or people who do not speak the language the user interface is created in to more easily use applications. In an exemplary embodiment, the computer novice interface for illiterate or near-illiterate users comprises a map that is not dependent on text for user operation. In another exemplary embodiment, the computer novice interface for illiterate or near-illiterate users comprises a job search database that is not dependent on text for the job search portion of the operation. The map and the job interfaces are used for the purpose of illustration only, and do not limit the technology and associated principles presented herein.

II. Introduction

Figure 1:
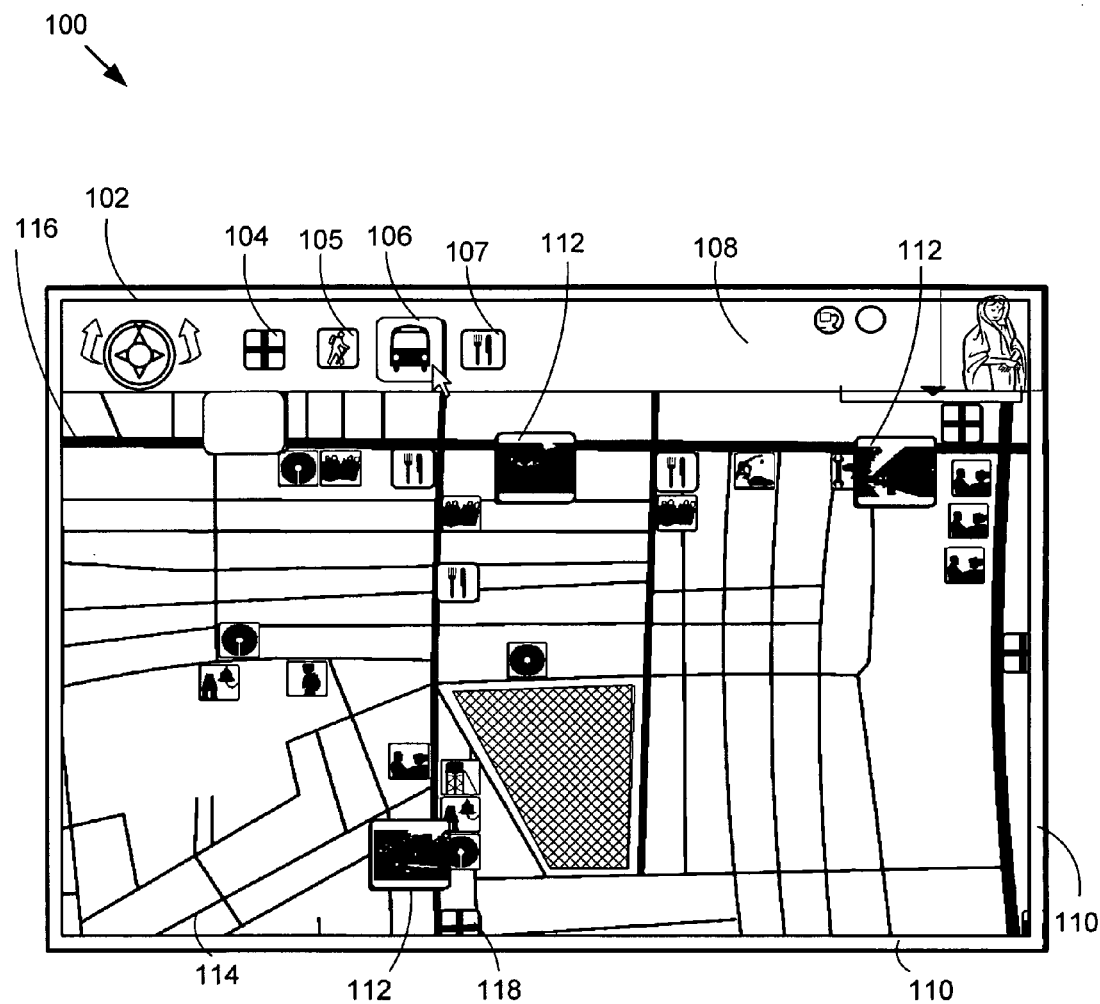
FIG. 1 is a block diagram which illustrates a screen shot of an exemplary interface for providing a computer novice user interface in conjunction with which described embodiments may be implemented.

With reference to FIG. 1, an exemplary user interface 100 is shown that increases the ease of computer application use for illiterate or semi-literate people. As such programs are not text-driven, they can also easily be used by people who speak a variety of languages. The information which is normally associated with text is instead replaced by interaction, spoken language delivered as recorded or synthesized audio, clear icons, and so forth. For illiterate or near-illiterate users, the method presents a subset of the following features: semi-abstracted graphical icons for all controls (user-interface elements) with action cues for representations of verbs, voice feedback on all controls, a consistent help feature that plays instructions and background information for users (via audio or video), optional use of numbers (as many illiterate users can nevertheless read numbers), and a visual filtering mechanism whereby relevant controls visually highlight when a control representing their category is selected or moused over.

Textless Interaction

An exemplary embodiment uses no text whatsoever. Although the interface, generally, is expected to be able to function with a minimum of or no text labels, an option exists in some embodiments to label interface items completely or partially with text markers. These may optionally be introduced in a graduated manner, so that the interface begins by being totally without text, but with use, the appearance of text increases. This mechanism prevents illiterate users from becoming intimidated by the appearance of text and introduces text only once the user becomes familiar with the interface. Other implementations allow a user to decide the amount of text that should be displayed.

Optional Use of Numbers

Even people who are completely illiterate can often read numbers. Therefore, an optional embodiment allows numbers to be displayed on the screen.

Semi-Abstract Icon Representation

Each control is represented by a graphical icon displayed on the interface. In general, a wide range of graphical representations can be used, from extremely realistic photographs to abstract cartoons, but generally, semi-abstract cartoons are envisioned as being used. In some cases, the deeper a user delves into a section of an application to get more information about a specific object, the graphical representation of the object will become increasingly photorealistic. For example, and with reference to FIG. 1, a semi-abstract icon, such as the bus stop icon 106 may be used for the general case (all bus stops), with a more representational icon 112 used to represent a specific bus stop. In the exemplary map shown in FIG. 1, each specific bus stop is represented by an actual picture of the bus stop, but more generalized icons are also envisioned.

In certain cases, icons that are too generalized are to be avoided. For example, to show which way cars are traveling on a road, it is preferable to show a car icon clearly pointed the correct direction, rather than an arrow, which may not be automatically associated with a car for someone who lacks many literacy skills.

Action Graphic Representatio

Figure 7:
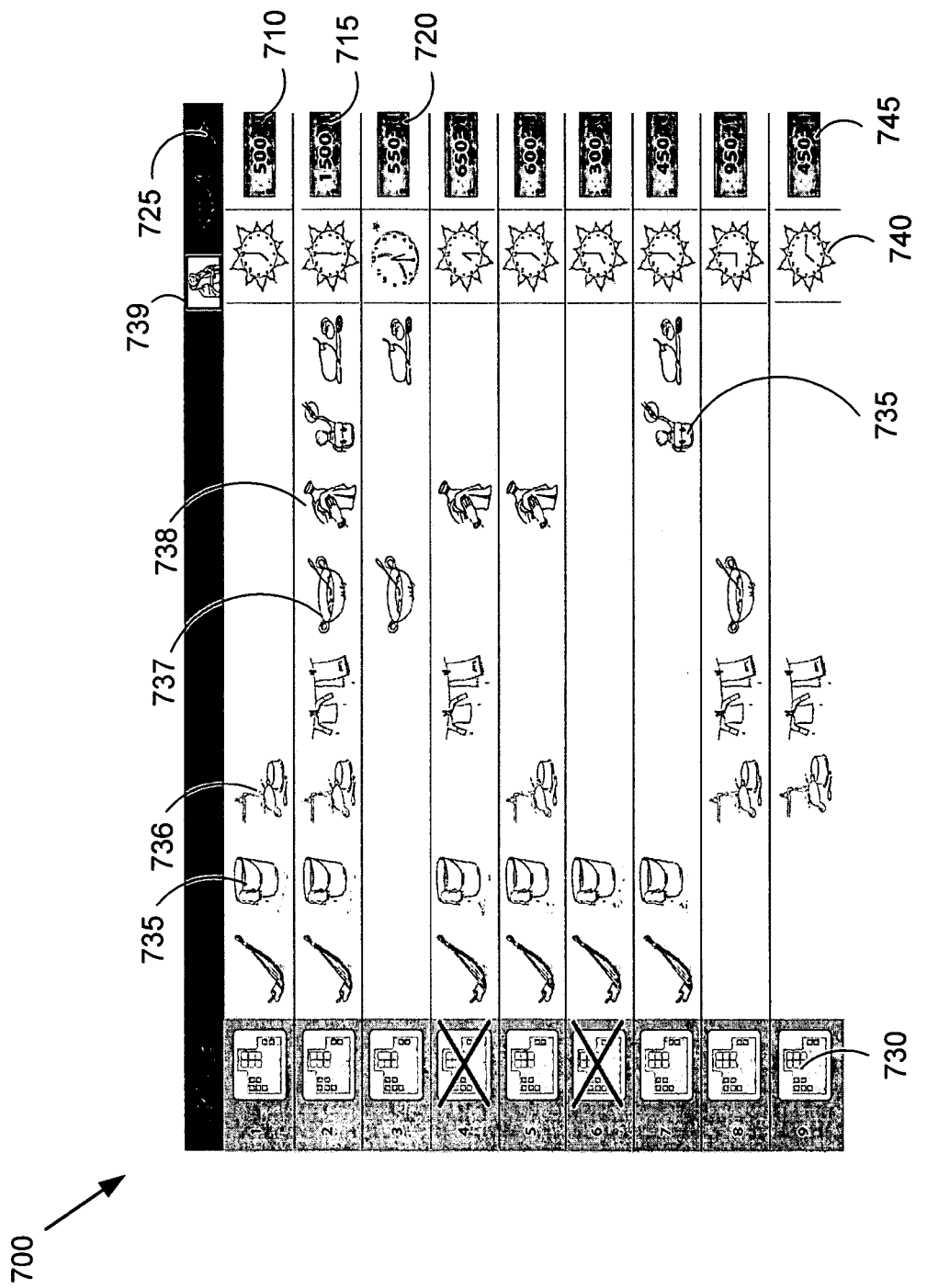
FIG. 7 is a block diagram which illustrates a screen shot of another inner page of the exemplary interface shown in FIG. 5 in conjunction with which described embodiments may be implemented.

Action activities—verbs—such as "wash", "clean", "cook", and "dry" optionally are identified with a picture that contains standard visual cues for indicating motions. One application suitable for using with the embodiments taught here is a Job Search application which, among other functions, instructs potential employees which jobs they will be expected to perform. With reference to FIG. 7, the icon that represents "clean a room" 735, includes a representation of a dripping sponge. Similarly, an icon that represents washing dishes 736 includes a visual representation of water pouring on dishes. The cooking icon 737 includes a visual representation of a fire, and a drying dishes icon 738, is a cartoon of hands drying dishes.

Voice Feedback

Icons, in an exemplary embodiment, are not labeled with text. Instead, at least some of the objects within the graphical user interface "talk." When a user passes a cursor through a control, or hovers the cursor over the control or a portion of the control, the voice associated with the interface optionally may speak the name of the control, give a brief description of the control, or give a fuller description of how to use the control. In an alternate embodiment, other information about the system and/or the control is spoken. In yet another embodiment, the length of the explanation given is related to amount of time the cursor hovers over the object.

Consistent "Help" Feature

Help is preferably provided at three levels: an application-level help feature which the user encounters prior to or just after beginning to interact with application, a screen-page level help feature, and control-level help features. In some embodiments, video is used for help features, in some embodiments, audio help alone is provided, and in yet other embodiments, both video and audio help features are provided. For example, the application-level and the page-level help feature, in an exemplary embodiment, can be provided as video, with the control-level help feature limited to audio.

At the very first screen a user encounters, the application can be explained. For example, a video may play continually which discusses the context and the features of the application. In alternate embodiments, the video may only begin playing when a user interacts with a computer running the application. This help feature ideally give the user enough information to begin exploring the application. For example, it may explain at least some of the context of the application, the use of the application, the use of specific controls on a specific page a user is viewing, and how to operate an input device associated with the application.

A consistently appearing and consistently available page help feature is also provided on essentially each screen page associated with the application. This help feature ideally explains at least some of the context of the application, the use of the application, the use of specific controls on a specific page a user is viewing, and how to operate an input device associated with the application. Preferably, this help feature is located at the same spot on each screen page to allow a user to easily find it. This feature may be triggered by mouse-over, mouse-hover, or by some other user input option.

Control-level help features provide information about specific controls or icons that a user may encounter on a specific page. Essentially all controls should have a help feature which is triggered in a standard way, and explained, optionally, by the application-level help feature and/or the screen page level help feature. The control help may be triggered by mouse-over, by mouse-click, by pen-tap, or by another method. In some embodiments, the amount of information given by the help system is dependent on how long an input device, such as a mouse, is positioned over the control.

Finally, in an exemplary embodiment for novice users of an application, a video is shown as an introduction to the application in which human actors act out the intent and use of the application. This video significantly lowers the barrier of comfort and understanding for novice users.

Virtual Characters

Figure 3:
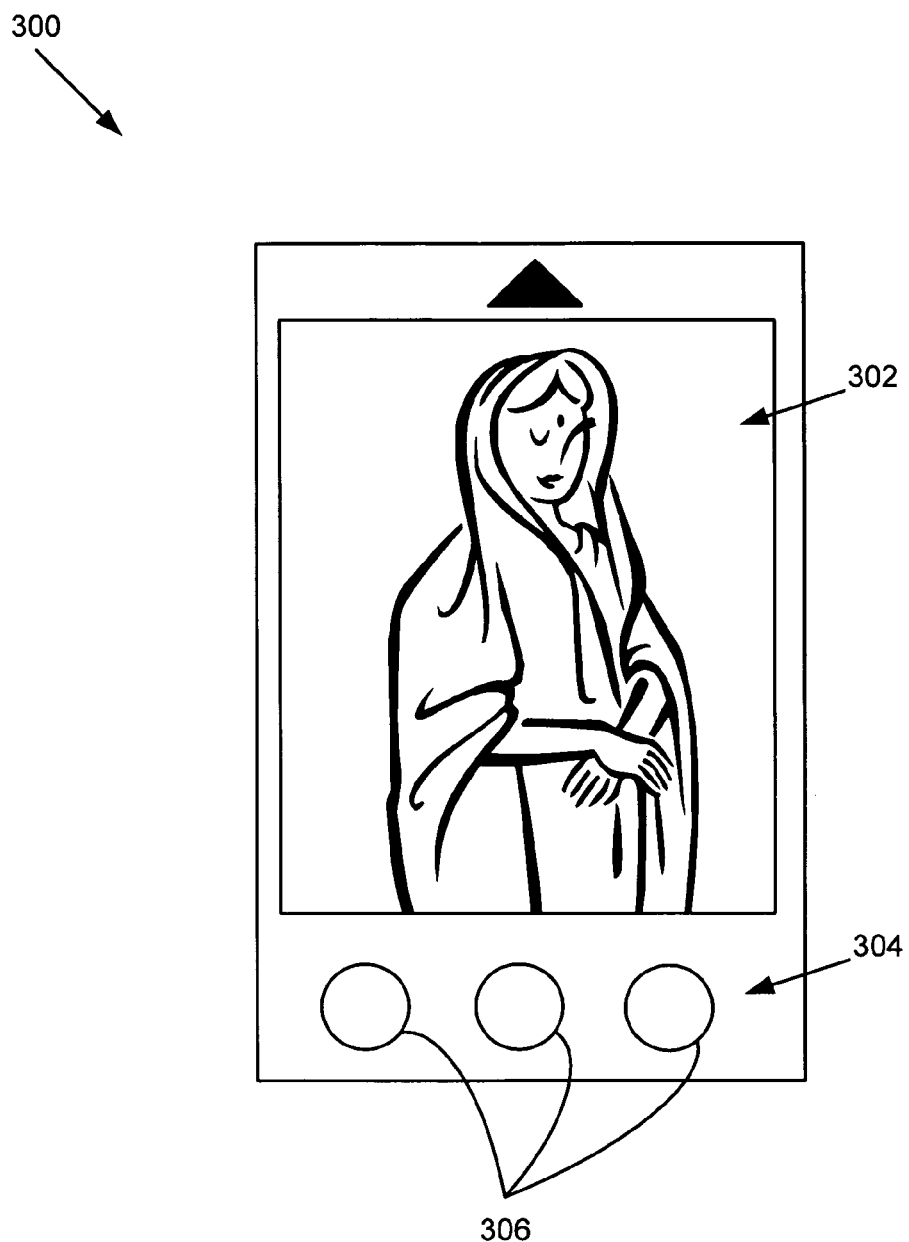
FIG. 3 is a block diagram which illustrates a screen shot of an exemplary control for use with described embodiments of the computer novice user interface.

In some implementations, an on-screen virtual character is used which appears to be speaking the help messages. If a virtual character is used, it can be used with all three levels of help: application-level, screen-page level, and control-level; or it can be used with just a subset. With reference to FIG. 3, a control 300, which contains both a virtual companion 302 and a language selection tool 304, is shown. The virtual character 302 can be a character that appears on the interface when spoken information is given, and which coordinates its actions with the voice explanations. For example, the interface (or a program module associated with the interface) will provide a spoken explanation when the user encounters (such as by mousing over) a control or the page screen level help icon. The spoken explanation can be associated with the virtual companion 302 appearing to speak. In other embodiments, the virtual companion 302 can always be displayed, but is only animated when the voice associated with the interface is giving information. In some embodiments, the virtual companion 302 is animated, and its actions are synchronized with the voice. In some implementations, a user can choose the style of the virtual companion—male, female, human, elephant, dog, airplane, etc.

Selection Options

People that are unfamiliar with computers often have trouble clicking on a specific icon, or even positioning a cursor on top of an icon. In an exemplary embodiment, an icon will increase in size when a user mouses over the icon, or otherwise points at the icon with a selector tool. Also, when the icon changes size it can signify to a user that it is an interactive device, and the user should pay attention to it.

The system provides, among other forms, a clickless mode of interaction. Selectable graphical controls, such as icons, have the option of being selected when the cursor hovers over them for a predetermined period of time without the user performing an explicit selection action, such as clicking a mouse. If an icon is to be selected on cursor hover, then, prior to the automatic selection, optionally, a voice associated with the interface tells a user that the icon will be selected without further user input.

When a user hovers a cursor over an control, a short description of the control, how the control can be used, and/or other useful material is automatically spoken by the program. In an illustrative embodiment, the information about the control is given before the control is automatically selected by the system. Generally, controls will also respond to explicit user action, such as by clicking a computer mouse button.

In any case, the help feature provides voice or video instructions and background context for all views of the application such that users can consistently utilize the feature to gain information about how and why to use the application.

Optional Visual Filtering

The system also provides visual searching. Users can select a search control and results from an associated search are returned visually, often in the form of icons. In an alternate embodiment, when a control is selected by mouse-over, by clicking on the control, etc., all graphical elements associated with the control highlight in some manner. The highlighting may comprise changing color, changing size, animating, flashing, some combination, and so on.

For example, if a "bus stop" icon is chosen, all of the bus stops on a map can be highlighted. Search controls can be combined, in some embodiments, allowing users to, for example, select both a hotel control and a bus stop control. In such a situation, hotels with the nearest bus stop would be returned. In some systems, the search controls are all placed in a defined area of a user screen. Similarly, the results icons can all be displayed in a second area. In systems where the controls are already displayed, such as the illustrated map embodiment, the icons which represent the search results can be accentuated—they can be highlighted, animated, their color can change, they can expand, and so on. The results can also be ordered, and presented to the user in an ordered fashion.

Multiple Language Control

A language control 304 can also be included. It can be connected to the virtual companion control 300, or may be a separate control. The language control 304 includes a way for the user to change languages in which explanations are spoken. The illustrated embodiment shows a plurality of buttons 306. In an exemplary embodiment, when the cursor hovers over one of these buttons 306, a name of a language is spoken in that language. If the user chooses that button (by cursor hover or direct user input) then the spoken messages are given in the chosen language until the language is again changed.

In some embodiments, the language may reset to a default language after some period of interface idleness. In another embodiment, words in the given language may be used to identify language buttons. This option may be most useful when languages with different letter forms are used. For example, the differences between Chinese ideograms and English characters are easily identifiable. Even if members of a population are illiterate, or nearly so, they may be able to identify the letter-forms of their language. In such a case, the text forms would not be used for their literal meaning, per se, but rather to signal that language functions could be found here.

III. Exemplary System Embodiment of a Computer User Interface for Illiterate Users With reference to FIG. 1, an exemplary user interface 100 is shown that incorporates embodiments presented herein to, among other things, increase the ease of computer application use for illiterate or semi-literate people. A portion of a computer-generated user interface 100 is shown. Although this embodiment utilizes a city map, those skilled in the art will recognize that alternate embodiments can utilize other electronic forms of graphical content, such as larger scale geographical maps, such as the map of an entire country; smaller-scale maps, such as the map of a hospital; diagrams, photographs, etc. The computer-generated user interface can be associated with a personal computer, a laptop computer, a tablet, a Personal Digital Assistant, a computer associated with a kiosk, and so on.

The computer-generated user interface 100 accepts commands from an pointing device that controls a cursor. This pointing device can be a computer mouse, a stylus, a touch-screen, a joystick, a trackball, a touchpad, a trackpoint, a keyboard etc. The cursor, often shaped like an arrowhead, indicates the location pointed to on a screen that is displaying the interface.

The computer-generated user interface 100 has a first area 108 that has a number of actionable icons, or controls. These controls include an integrated control 102 and a plurality of icons 104, 105, 106. The integrated control 102 is used to manipulate an image found in the second area 116 of the interface. The icons, which often have commands associated with them, can be bitmapped images, animated icons, line drawings, photographs, a combination of the mentioned items, and so on.

People that are unfamiliar with computers often have trouble clicking on a specific icon, or even positioning a cursor on top of an icon. In an exemplary embodiment, an icon will increase in size when a user mouses over the icon, or otherwise points at the icon with a selector tool. Also, when the icon changes size it can signify to a user that it is an interactive device, and the user should pay attention to it.

The system provides, among other forms, a clickless mode of interaction. Selectable graphical controls, such as icons, have the option of being selected when the cursor hovers over them for a predetermined period of time without the user performing an explicit selection action, such as clicking a mouse. If an icon is to be selected on cursor hover, then, prior to the automatic selection, optionally, a voice associated with the interface tells a user that the icon will be selected without further user input.

When a user hovers a cursor over an control, a short description of the control, how the control can be used, and/or other useful material is automatically spoken by the program. In an illustrative embodiment, the information about the control is given before the control is automatically selected by the system. Generally, controls will also respond to explicit user action, such as by clicking a computer mouse button.

Icons, in an exemplary embodiment, are not labeled with text. Instead, at least some of the objects within the graphical user interface "talk." When a user passes a cursor through a control, or hovers the cursor over the control or a portion of the control, the voice associated with the interface optionally may speak the name of the control, give a brief description of the control, or give a fuller description of how to use the control. In an alternate embodiment, other information about the system and/or the control is spoken. In yet another embodiment, the length of the explanation given is related to amount of time the cursor hovers over the object.

Although the interface, generally, is expected to be able to function with a minimum of or no text labels, an option exists in some embodiments to label interface items completely or partially with text markers. These may optionally be introduced in a graduated manner, so that the interface begins by being totally without text, but with use, the appearance of text increases. This mechanism prevents illiterate users from becoming intimidated by the appearance of text and introduces text only once the user becomes familiar with the interface.

The computer generated user interface 100 also has a second area 116. This area, in the illustrative embodiment, is a map.

Figure 2:
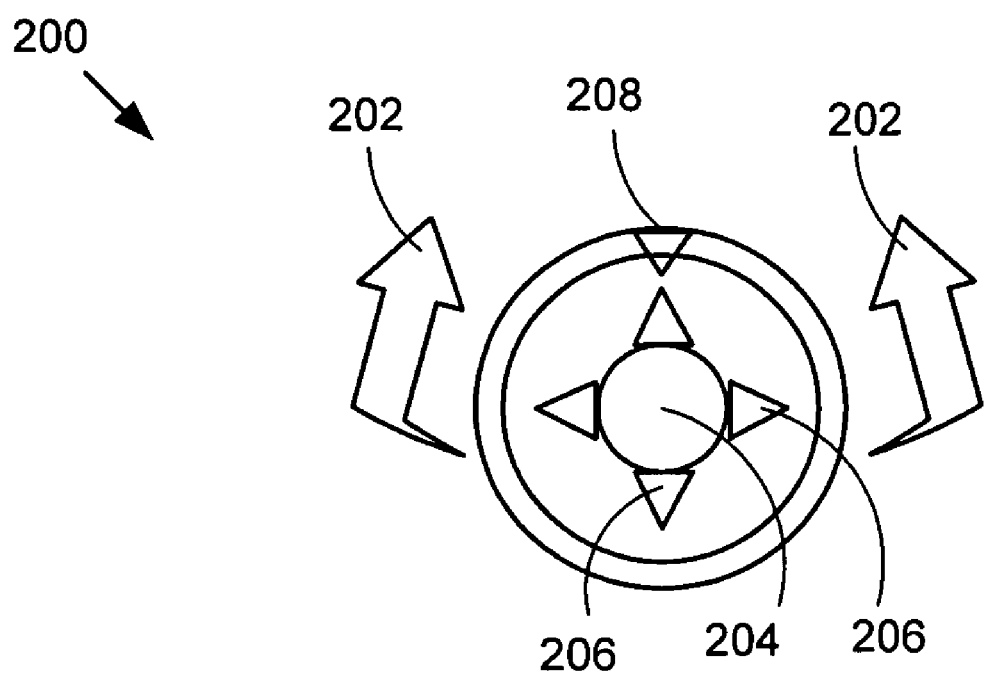
FIG. 2 is a block diagram which illustrates a screen shot of an exemplary integrated control for use with described embodiments of the computer novice user interface.

With reference to FIG. 2, an embodiment of the integrated control 200 is shown. The integrated control 200 is provided to rotate the second area 116 (in FIG. 1) which, in the illustrative embodiment, is a map. The integrated control 200 comprises rotational arrows 202. These rotational arrows 202 rotate the second area 116 in the direction of the arrows. They rotate when a cursor is detected to be hovering over them for some period of time. This allows a user to place the cursor over one of the arrows and the second area 116 picture will rotate after a short delay (cursor hover), without explicit user selection of the arrow. The rotational arrows 202, can also rotate the second area 116 when explicitly selected by a user, such as by a conventional mouse click. If the rotational arrows react on cursor hover, a reasonable time passes before the action occurs. In an exemplary embodiment, the rotational arrows should not react if the cursor is slid across the arrows, but the delay should not be so long that a user thinks that the arrows are non-responsive.

A reset button 204 is also included. When selected (by mouse hover or by direct user selection, by, for example, clicking a mouse button) it resets the second area to a default position. An exemplary embodiment allows selection of the reset button 204 only by direct user selection. Direction arrows 206 are also provided. The illustrated embodiment shows four arrows at the four cardinal compass points. Selecting an arrow refreshes the picture on the second area 116, with the second area map picture now in the specified orientation. The direction arrows, in some embodiments, are each a different color. The second area 116, in an exemplary embodiment, has color markings that give visual clues as to the eventual orientation of the map, by, for example, having different colored bars in each side of a border 110 associated with the second area 116, with the color on the bars corresponding to the color of one of the direction arrows.

With continuing reference to FIG. 1, much of the information in the second area 116 is displayed in the form of icons 118, 120, 122 that represent landmarks. These may be physical landmarks, such as important locations associated with a physical place, or may be conceptual locations, as well. Examples of sample physical landmarks that might have associated icons are: hospitals, taxi stands, bus stops, schools, churches, restaurants, stores, hotels, and so on. Depending on the mode the program is in, visual feedback about the landmark may be given for cursor hover, as well as when an icon is directly user selected. This visual feedback can take the form of the icon expanding, changing color, shrinking, animating, and so on. However, for people with little experience with computers, a larger icon can be easier to use. The icon may be replaced by an actual picture of the landmark it represents, as well. On cursor hover or mouse-over, a voice associated with the interface may explain more information about the landmark. More generally, when a user drills down to find more information about a specific object, such a landmark, the representation of the object should get more realistic.

The second area 116 view can be panned, as well. The second area 116 further comprises a border 110 on all four sides of the map. An exemplary embodiment makes the border 110 sixteen pixels wide. Alternate embodiments can have the border on one, two, or three sides only. Other implementations can have a border 110 icon, which could be implemented as a stand-alone icon that performs the same function. On detecting cursor hover within the border 110, the interface optionally responds by saying the name of the direction associated with that border, and pans the image in the second area 116 in the direction of the cursor. Users can also move the cursor along the border to move the second area 116 in the direction of the cursor. More traditional forms of panning can also be provided, such as panning at least a portion of the second area 116 in the direction of the cursor when the user click-and-drags the cursor at a location within the second area 116 while holding down a specific key such as the control key.

Zooming in and out can also be provided, using methods known to those in the art.

When the second area 116 represents a map of a physical location, roads 114 can be shown. When the cursor hovers over or slides across a road, the direction of traffic on the road can be shown. In a preferred embodiment, the direction of traffic is shown using a car icon with a recognizable front and back, rather than using arrows to indicate the direction. Other useful information about the road, such as whether it has been closed, the amount of traffic on it currently, etc. can also be displayed.

The system also provides visual searching. Users can select a search control and results from an associated search are returned visually. For example, if the "bus stop" icon 106 is chosen, all of the bus stops 112 on the map 100 can be highlighted. Search controls can be combined, in some embodiments, allowing users to, for example, select both a hotel control and a bus stop control. Results can display hotels with the nearest bus stop. In some systems, the search controls are all placed in a defined area of a user screen, such as the first area 108. Similarly, the results icons can all be displayed in a second area, such as the map area 116. In systems where the controls are already displayed, such as the illustrated map embodiment, the icons which represent the search results can be accentuated-they can be highlighted, animated, their color can change, they can expand, and so on. The results can also be ordered, and presented to the user in an ordered fashion.

With reference to FIG. 3, a control 300, which contains both a virtual companion 302 and a language selection tool 304, is shown. The virtual companion 302 can be a character that appears on the interface when spoken information is given. For example, the interface (or a program module associated with the interface) will provide a spoken explanation when the user encounters (such as by mousing over) an object. This spoken explanation can be in the form of recorded audio, synthesized audio, or a combination.

The spoken explanation can be associated with the virtual companion 302 appearing to speak. The appearance of speech can be created in a number of ways. For example, a video of someone speaking the words can be stored and replayed when needed; an animation program could be provided that synchronizes perceived mouth or lip movement with a recorded soundtrack could be included, and so on.

In other embodiments, the virtual companion 302 can always be displayed, but is only animated when the voice associated with the interface is giving information. In some embodiments, the virtual companion 302 is animated, and its actions are synchronized with the voice. In some implementations, a user can choose the style of the virtual companion— male, female, human, elephant, dog, airplane, etc.

A language control 304 can also be included. It can be connected to the virtual companion control 300, or may be a separate control. The language control 304 includes a way for the user to change languages in which explanations are spoken. The illustrated embodiment shows a plurality of buttons 306. In an exemplary embodiment, when the cursor hovers over one of these buttons 306, a name of a language is spoken in that language. If the user chooses that button (by cursor hover or direct user input) then the spoken messages are given in the chosen language until the language is again changed.

In some embodiments, the language may reset to a default language after some period of interface idleness. In another embodiment, words in the given language may be used to identify language buttons. This option may be most useful when languages with different letter forms are used. For example, the difference between Chinese ideograms and English characters is easily identifiable. Even if members of a population are illiterate, or nearly so, they may be able to identify the letter-forms of their language. In such a case, the text forms would not be used for their literal meaning, per se, but rather to signal that language functions could be found here.

Figure 4A:
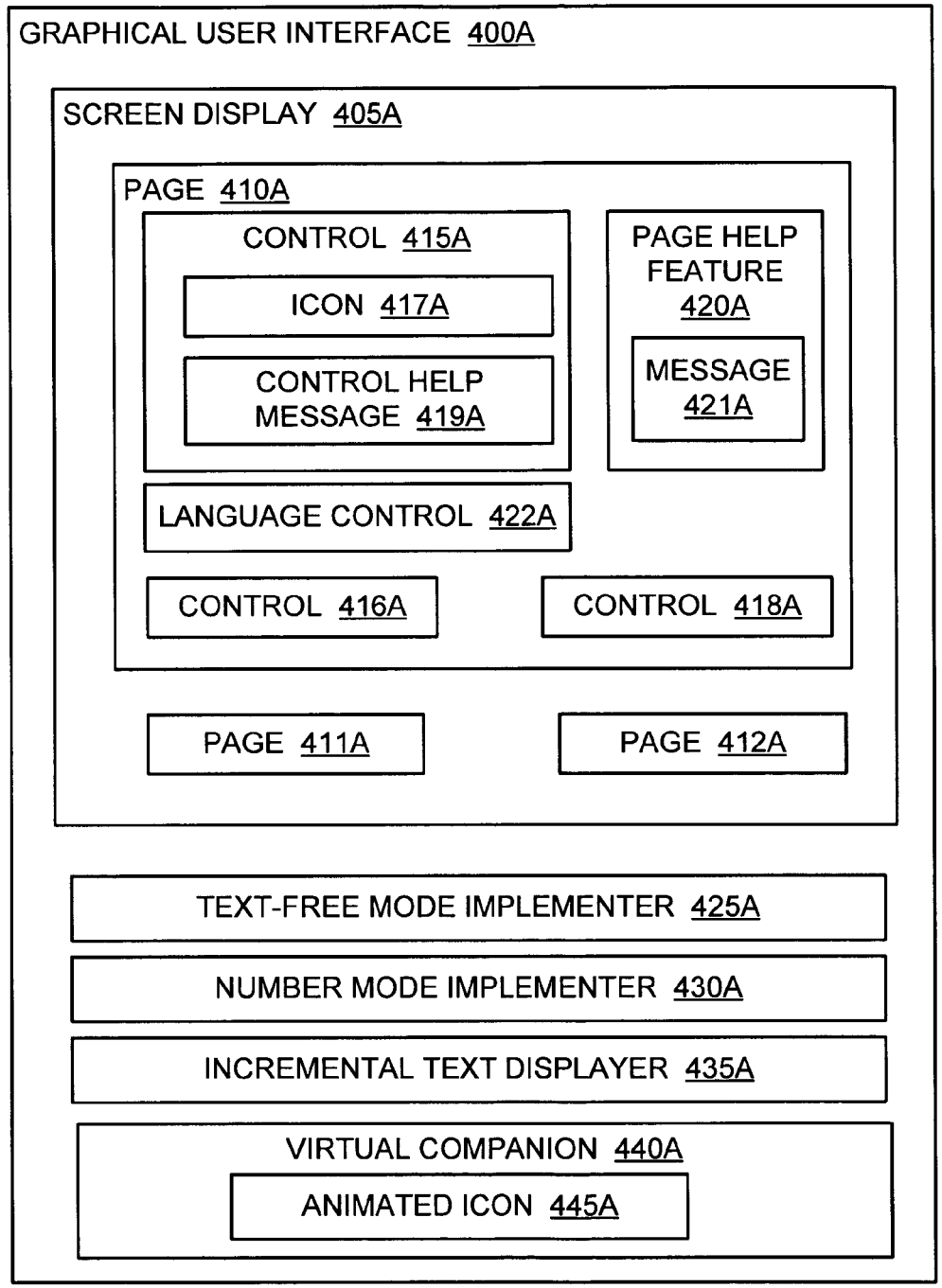
FIG. 4A is a functional block diagram illustrating an exemplary graphical user interface system for users with limited reading skills in conjunction with which described embodiments may be implemented.

IV. Exemplary System Embodiment of a Computer User Interface for Illiterate and Near-Illiterate Users FIG. 4A is a block diagram of an optionally textless graphical user interface system 400A which can be used by illiterates and near-illiterates.

The system comprises a screen display 405A, which is operable for displaying graphical controls in one or more text modes, and for accepting input from a user. The system also comprises a plurality of pages 410A, 411A, 412A, operable to be displayed on the screen display 405A. Each of these pages has a number of controls 415A, only one of which is shown in FIG. 4A for convenience only. A control 415A is a "hot spot" on a computer screen which causes something to happen when engaged by a user. The control is represented by an icon 417A. In an exemplary embodiment, this icon is an image recognizable to one without the need for a text label; this might be a semi-abstracted cartoon, such as the icons 816, 820, 824, found in FIG. 8.

Each control 415A, optionally, but preferably, also has a related control help message 419A, which is a message that gives information about the control 415A. This message may be activated when a user mouses over the control 415A, taps the control 415A, or otherwise activates the control 415A. In some embodiments, the help message 419A plays on mouse (or other input device) hover.

In some embodiments a virtual companion 440A (discussed in greater detail in conjunction with FIG. 3) is used. This virtual companion 440A may give friendly feel to the interface for people unfamiliar with computers, which it might not otherwise possess. In all cases, the virtual companion 440A presents a help feature which explains the context of the application and its use on each screen presented to the user in an application. If a virtual companion 440A is used, the virtual companion's 440A movements may be coordinated with the help message 419A, such that, for instance, the virtual companion 440A appears to be speaking. The virtual companion may be represented as an animated icon 445A.

The system is designed, at least in part, to be operational with no text labels. Therefore, a text-free mode implementer 425A is included, which ensures that no text appears on the screen. This text-free mode implementer is turned on as the default option in some embodiments.

However, the system is also designed to allow text labels in certain circumstances, such as when it is being used by an experienced or a literate user. Therefore, an incremental text displayer 435A is also optionally provided, which allows text to appear in certain circumstances, when some criterion is met. The criterion may be that a specific "display text" feature was activated, may be that text is incrementally turned on once a program has been run for a specific time, and so on.

A page help feature 420A is preferably included on each page 410A and at substantially the same location on each page 410A. This makes it possible for a user to be secure that help can easily be located. A page help feature message 421A associated with the page help feature may give information about the application itself, the specific page, and/or specific controls on the page. It may also give information on how to use an input device associated with the application. Furthermore, it may, on first activation, give a general statement, and then on subsequent activations on a single page, give more detailed information.

In some embodiments, the page help message is an audio message, in other embodiments, the message may be a video message.

Language controls 422A, as previously discussed with reference to FIG. 3 and associated text, may also optionally be included. These language controls 422A are each preferably associated with a different human language. Furthermore, the various help features, such as the control help message 419A associated with a control and the page help feature 420A associated with a page, are spoken in a specific language. When one of the language controls 422A is selected by a user, the help language for all of the help features is set to the selected language.

A number mode implementer 430A which allows numbers to be displayed on the screen display may also be included.

Figure 4B:
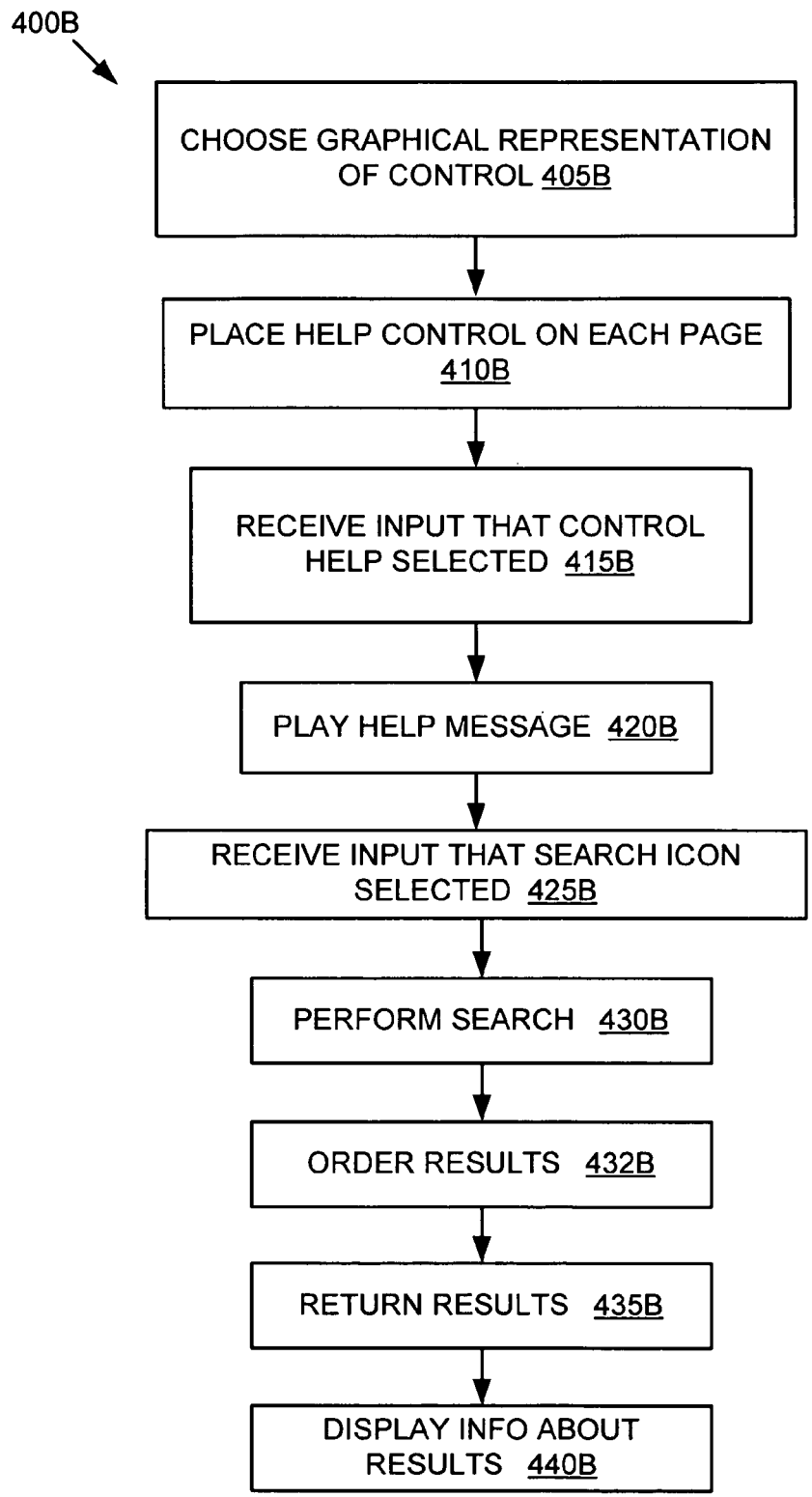
FIG. 4B is an operational flow diagram illustrating an exemplary method to provide a graphical user interface in conjunction with which described embodiments may be implemented.

V. Exemplary Method Embodiment of a Computer User Interface for Illiterate and Near-Illiterate Users FIG. 4B is an operational flow diagram 400B illustrating a process for using an computer interface to interact with an illiterate and possibly novice computer user. The interface itself has a plurality of textless pages. Each page has associated with it a number of controls. A control is essentially any object on a user interface display that has information or an action associated with it. For example, the control might be an icon, a button control, a hyperlink, a picture, a menu object, a combination list, and so forth.

The process begins at process block 405B, where a graphical representation is chosen for each control. The graphical representation should be a picture that is clear enough for the meaning to be understood by someone who is not familiar with standard computer icons and who cannot read. Therefore, in a preferred embodiment, the control representation does not include a text label. Semi-abstracted graphics, such as the graphical objects 802, 804, 808 associated with FIG. 8 of each control, are preferred but not required.

At process block 410B a help control associated with the page itself is placed on each page. The help control should be at substantially the same location on each page, allowing a user to easily locate it. This help control can give general information the specific application that is being run, information about the purpose and function of the specific page the user is on, information about input devices available to be used, and/or information about specific controls found on the page.

At process block 415B, information is received that a control has been help-selected. Help-selecting involves activating the help message. For example a control may activate the help message on mouse-over, mouse-hover, or after tapping a pen input device on the control once, where tapping twice "selects"—activates the control.

At process block 420B, the help message associated with the control is played. The help message, which gives information about using a specific control may be short or long, or something in between. Specific user action may dictate the length of the message. For example, a control that help-selects on mouse hover may play a very long message, with the playback continuing as long as the mouse is hovering over the control.

At process block 425B, input is received that a search icon is selected. Examples of search icons can be found in FIG. 1, at 104, 105, 106, 107. When a search icon is selected, in an exemplary embodiment, it highlights in some fashion. The bus icon 106 has grown larger, indicating that it has been selected.

With continuing reference to FIG. 1, in an exemplary embodiment the bus search icon 106 has the search "find all bus stops" associated with it. In some embodiments, more than one search icon can be selected. Then, the returned items can reflect both searches. For example, if an icon representing the concept "cheap" were selected along with the restaurant icon 107, all the cheap restaurants will be returned as search results.

At process block 430B the search associated with the search icon is performed. If the bus icon 106 is selected (with reference to FIG. 1) then, in the embodiment shown all of bus stops are located.

At optional process block 432B, the results of the search are ordered. Examples of ordering include ordering results by relevance, by alphabetical or numerical name, by color, and so on. In the illustrated embodiment shown in FIG. 1, the search results are associated with a physical location on a map—the bus stop location. Ordering can comprise highlighting the bus stop closest to the user more brightly than the other bus stops. Furthermore, the bus stops could each be highlighted to indicate distance from the user. Other orderings are envisioned. For example, hotels can be ordered by cost, jobs (in a job application) can be ordered by the hourly wage, and so on. The process continues at process block 435B.

At process block 435B, the results of the search are presented. The results in the bus search example are that all of the icons that represent bus stops 112 are returned as search results.

At process block 440B, information about the returned results is then displayed. Each of these bus stop icons 112 is then presented as a search result to the user. In the discussed embodiment, bus stop icons (at locations that represent the bus stop locations on the map) are replaced with pictures of the actual bus stops. This gives users who are not familiar with the map area another visual clue, and it also helps users who may not be familiar with maps by giving them concrete evidence of locations, allowing them to more easily connect the map being displayed with the actual physical territory represented by the map. Other alternate methods of display can be used such as playing a voice message associated with the search result icons, animating the search result icons, highlighting the icons in another fashion, and so on.

VI. Exemplary Job Location Embodiment of a Computer User Interface for Illiterate Users Method An exemplary embodiment of the computer interface for illiterate users involves building an application for domestic labor markets. An exemplary embodiment allows two user groups to communicate on a common platform: employers looking for domestic help and domestic helpers looking for jobs.

In such an embodiment, every employer can fill out a template form based on the requirements he/she has for domestic help. This form is, preferably, a textual form that includes details such as the employers' address, chores he/she wants to be performed, number of rooms in his/her home where chores such as sweeping and mopping are to be performed and the wage break-up per chore he/she is ready to offer.

Textual information entered by the employers is translated into information presented as icons and visuals for the employees to view.

The domestic helpers can "read" visual information about a prospective job presented in the form of icons. This information includes details such as the address of the employer, chores to be performed along with wage break-ups for each chore, work hours required and details of the rooms in the house where the chores need to be performed.

Figure 5:
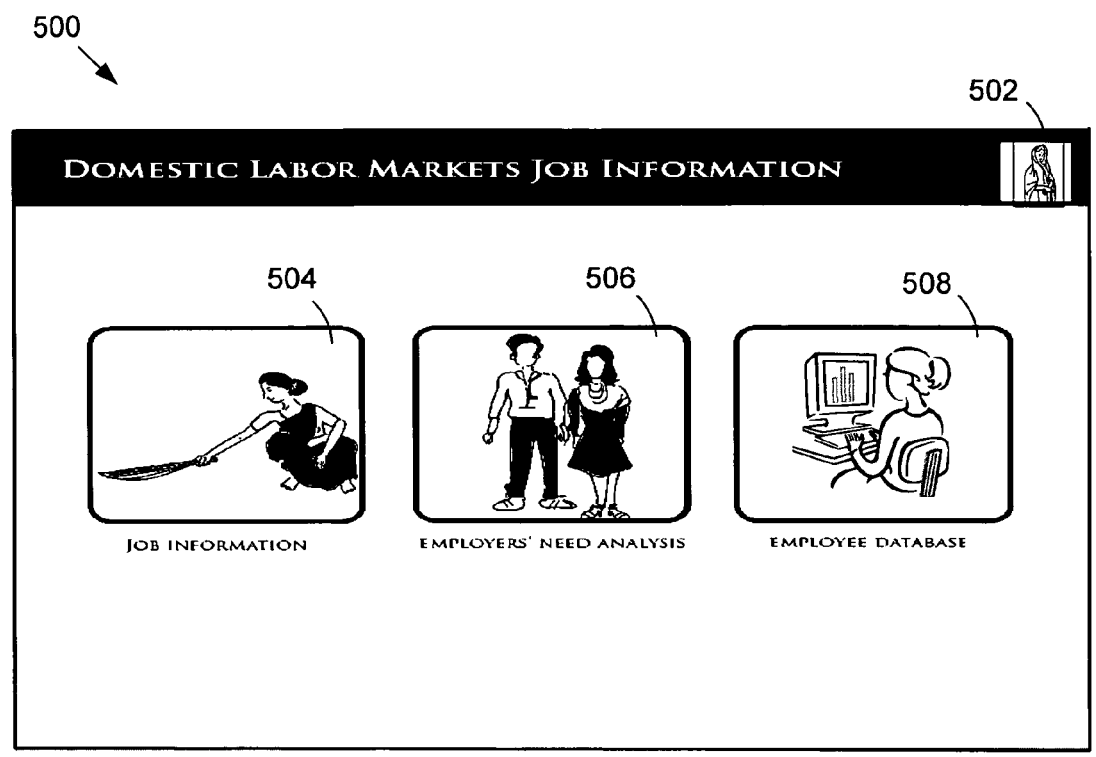
FIG. 5 is a block diagram which illustrates a screen shot of an early page of an exemplary job information interface in conjunction with which described embodiments may be implemented.

When a user initially interacts with the application, an introductory movie plays. In some embodiments the movie plays continuously in a loop until interrupted by some user input. In other embodiments, the movie begins playing when the application has an indication that someone is watching. Such an indication may comprise the user touching a mouse, touching a screen, speaking to the screen, and so forth. The movie can consist of a role-playing clip in which human actors show the value of the application, as well as instructions of how to navigate through the application. The movie is designed, in an exemplary embodiment, to teach novice computer users how to interact successfully with the application. A sample set of problems that might be addressed in the movie are shown below 1) Why the application would be interesting for the potential user
2) How to hold the stylus/mouse
3) How to mouse over icons
4) How and when does voice play
5) How to go into the next screen
6) Where to mouse over an icon for what particular information Once the introductory screen has finished playing, a first screen is presented, in an exemplary embodiment. The first screen consists of three modes:

a) Job information for employees
b) Employers' needs analysis form
c) Employee database In an exemplary embodiment, the first screen does not have an intimidating large amount of information on it. A sample first screen is shown in FIG. 5.

A "help" icon 502 is provided in some embodiments, which gives instructions for interaction with this particular screen 500. A voice preferentially plays when a user mouses over or otherwise selects the icon. Sample information given vocally by the "help" icon can be: how to mouse-over (or otherwise select) other icons to receive information about those particular mode, how to navigate to the next screen, how to select an icon, and so on. Each icon is deliberately oversized to make it as easy as possible for a novice computer user to select. Selecting the job information icon 504 opens up the job information window, described in more detail in FIG. 6. Selecting the employers' need analysis icon 506 opens up a window that leads to a database with a more traditional layout, as it is designed, in at least an exemplary embodiment, for users with more robust computer skills.

Figure 6:
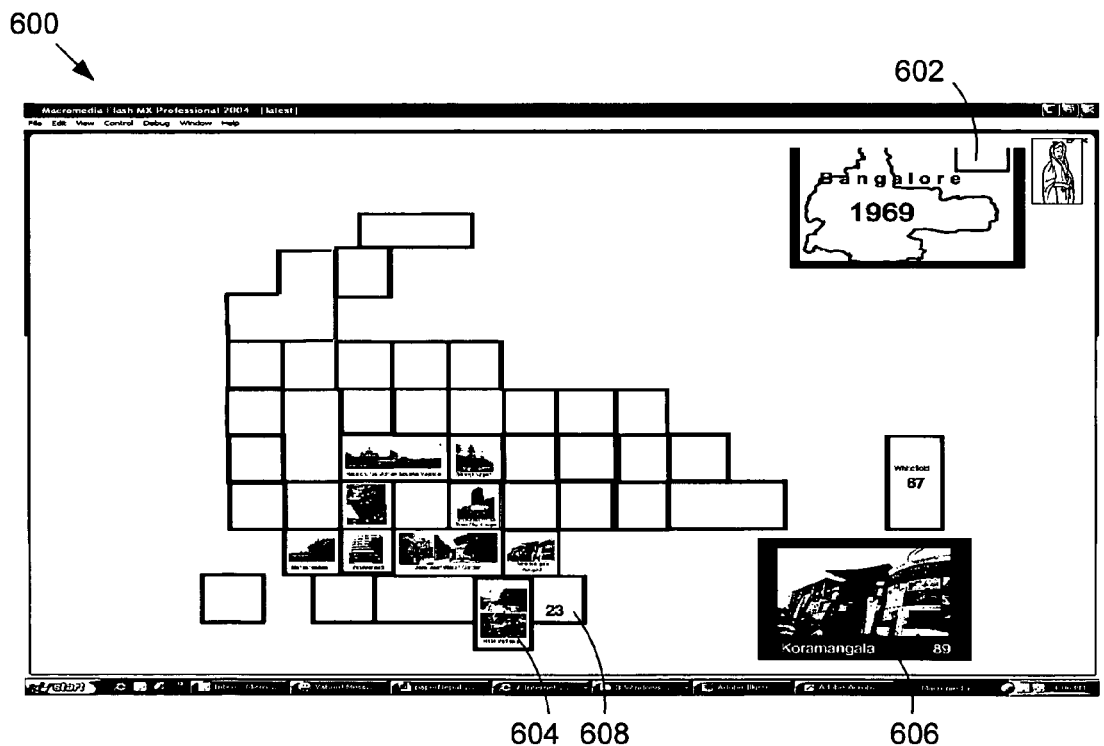
FIG. 6 is a block diagram which illustrates a screen shot of an inner page of the exemplary interface shown in FIG. 5 in conjunction with which described embodiments may be implemented.

With reference to FIG. 6, on selecting the job information icon 504, a second screen 600 is displayed, which in this embodiment shows the map of Bangalore. On this screen 600, the user is able to learn the number of jobs available in specific areas of a target location. The inset on the top right hand corner 602 also shows the total number of jobs available at the current time in the target location, which in this embodiment is the city of Bangalore.

The map of the target area is divided into defined shape, which in this exemplary embodiment are rectangles. Each shape represents particular areas within the target location. Each of these shapes, in some embodiments, has a picture of a landmark (such as a church, temple, important structure, sculpture, park, etc.) 604 that distinguishes that place. The number of jobs available in that area at that point of time can also be displayed 608. In an exemplary embodiment, a picture or icon of the specific place that is most commonly thought of as representing the area defined by the shape is provided as a marker within the shape.

On mouse-over, or other user input, one or more of the following actions can occur in various exemplary embodiments:

a voice can mention a name given to an area in the shape, or can give other explanatory material,
the shape can enlarge,
the landmark within the shape can enlarge,
the shape can change color or shape, and/or
the number of jobs available within the shape can be displayed.
an enlarged icon is displayed elsewhere, with a clearer picture, more information, etc. 606.

With reference to FIG. 7, selecting one of the shapes (by mouse-hover, clicking a mouse button, tapping a stylus, etc.) on the map 600 displays a third screen 700, which, in an exemplary embodiment, consists of job information for that particular area.

The third screen 700 consists of a number of sub pages 710, 715, 720, and so on. Each of these sub-pages consist of information about some number of jobs. The exemplary embodiment shown shows an implementation with nine jobs per page. Each of these jobs represents ordered information. The user is able to click through the different sub-pages to view all the jobs available in that particular area by selecting the next page symbol 725 and is able to revert back to previous pages at any point of time. The next page symbol, in an exemplary embodiment, will provide information on how to use the control, on mouse hover or similar tentative selection.

Each sub-page 710, 715, 720 consists of the basic information about a job all represented by icons, such as the address of the employer 730, the chores required to be performed 735, the time at which the domestic employer should come to work 740 and the total wage per month a worker would receive 745. Each icon, on mouse-over or other user selection means, describes the information for that specific job. So, for instance, mousing over or otherwise selecting the apartment icon 730 produces a voice giving the address of the job. In some embodiments, an animated virtual companion is shown on the screen speaking when the voice speaks. In other embodiments, the virtual companion is shown on the screen when the voice speaks, but is not animated.

The information about each of these jobs can be presented in an easy-to-grasp fashion. In this described embodiment, the information is presented with the information laid out horizontally for a specific job. This allows the presentation of basic information about a particular job and at the same time accommodates multiple jobs on one sub-page. Other implementations can display the information laid out vertically, or in another easy-to-understand format.

Even when people don't read, they often adopt certain direction conventions of the native written language. So, for example, people in English-speaking areas start looking at a document or sign in the upper-left-hand corner and then scan right. The first item is seen as that in the upper left, with subsequent items being to the right. In a country with a different language convention, object order is seen differently. In Japan, for example, an illiterate person would be more likely to understand an object in the upper-right-hand corner as the first object and an object just below it as the second one. Conventions on this and similar screens may be mapped to the conventions of the native language of the users. So, for example, the sub-pages 710, 715, 720, in an alternate embodiment, are displayed vertically.

Beginning computer users may not understand that all the information present within the computer application may not be displayed on the screen at the same time. This problem is compounded when the beginning user does not understand the "next page" icons and so does not investigate those icons further. Therefore, some implementations scroll the sub-pages 710, 715, 720 and so on, to display all of the job listings available without requiring the user to look for extra information. This, or similar techniques can be used to consistently present more information, preferably ordered information, than can be displayed at any one time on a computer screen.

Some embodiments allow the voice messages to be given in a different language. When this is done, an alternate embodiment also changes the object grouping to follow the language conventions. In yet another alternate embodiment, grouped information is accompanied by arrows to explicitly tie the information together and to give a visual indicator of the direction in which it should be "read." An example of this can be seen in the clock icons 804, 806 of FIG. 8, which have an arrow between them to indicate which is the starting time 804, and which is the ending time 806.

Figure 8:
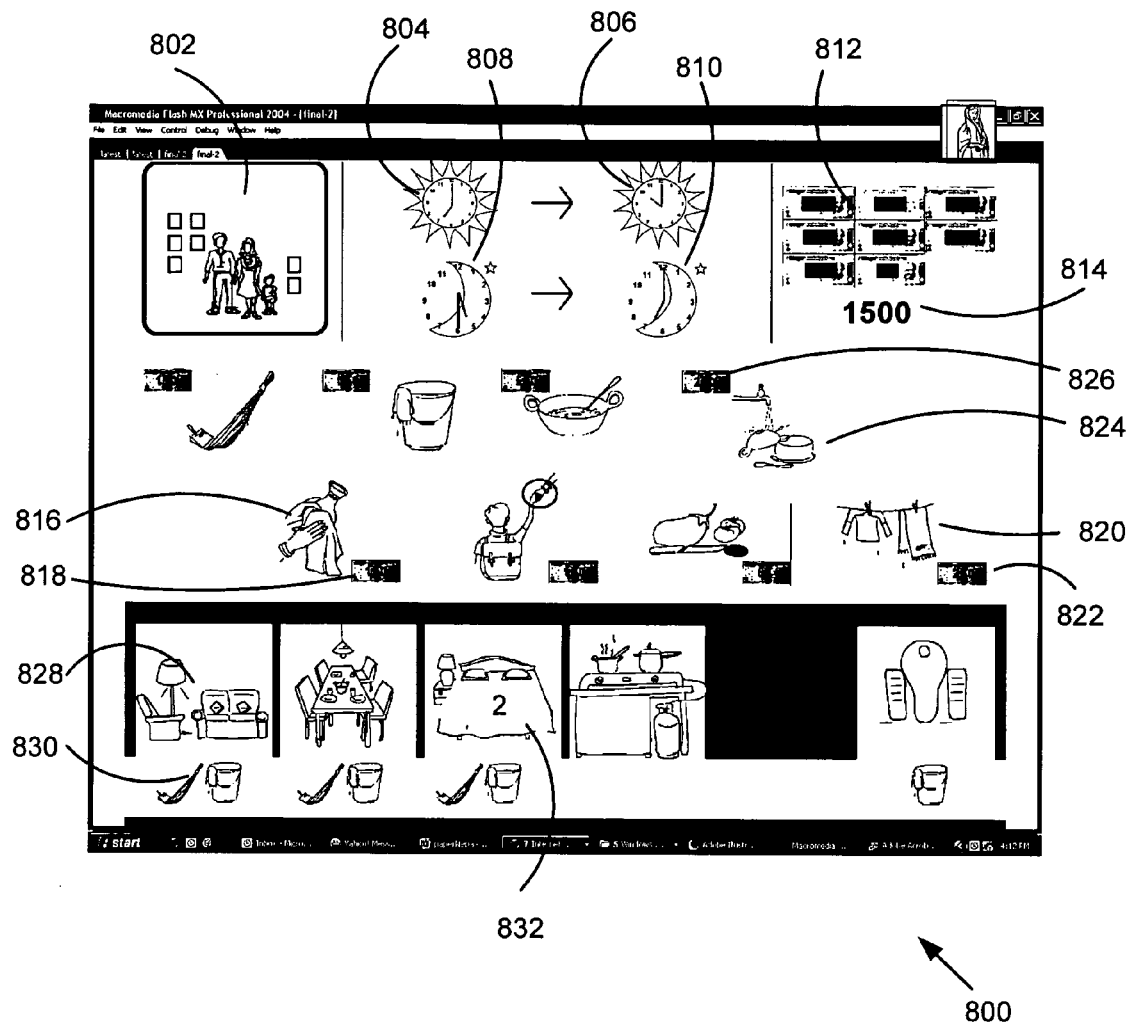
FIG. 8 is a block diagram which illustrates a screen shot of another inner page of the exemplary interface shown in FIG. 5 in conjunction with which described embodiments may be implemented.

With reference to FIG. 8, the screen 800 consists, in an exemplary embodiment, of detailed job information at one particular household. When a user clicks or otherwise selects any location within the area that represents one job, a final job screen 800 is displayed. The top-most left hand corner icon 802 represents the address of the employer. On mouse-over, or when this icon is otherwise selected, a voice plays the address of the employer.

The morning starting time 804 and ending time 806 are shown. These clock icons 804, 806, in an exemplary embodiment, have suns around them to indicate morning. In some embodiments, the voice provides the meaning and the starting and ending times for the morning when icons are moused over or otherwise selected. The afternoon starting time 808 and ending time 810, are also provided, in an exemplary embodiment. Preferably, there is a method of indicating that these are evening times. In at least some embodiment, evening is indicated by moons associated with the clocks 808, 810. In some embodiments, an arrow indicates the direction the icons are to be read, that is, which clock represents the start time, etc.

The total amount of money that the job pays is indicated by both pictures of the currency 812 and by a number indicating the total amount in a local currency 814.

In the illustrated embodiment, the next section of the screen breaks out each specific portion of the job by amount that is paid. Each individual portion of the job is indicated by an icon that is detailed enough to preferably be understood without a written label. For example, dusting is represented by an icon 816 that shows hands dusting a bottle. The dusting 816 is accompanied by a representation of money with the amount that specific portion of the job will pay 818 written on its face. As another example, washing dishes in represented, in this embodiment, with a faucet spraying water on dishes 824. Similar to the previous example, the amount paid for this task 826 is shown in close proximity. As a final example, washing the clothes is represented by an icon showing clothes hanging on a line 820. The amount of money paid for this task is shown 822 preferably close enough for the task and money to be correlated.

The third portion of the screen shows the rooms in the house in which tasks are expected to be performed. The icons show both the room (such as the living room 828) and the tasks to be performed in the room 830, such as sweeping and cleaning. If the house has more than one room with the same types of chores, such as bedrooms, then the number is indicated on the icon 832.

VII. Computing Environment

Figure 9:
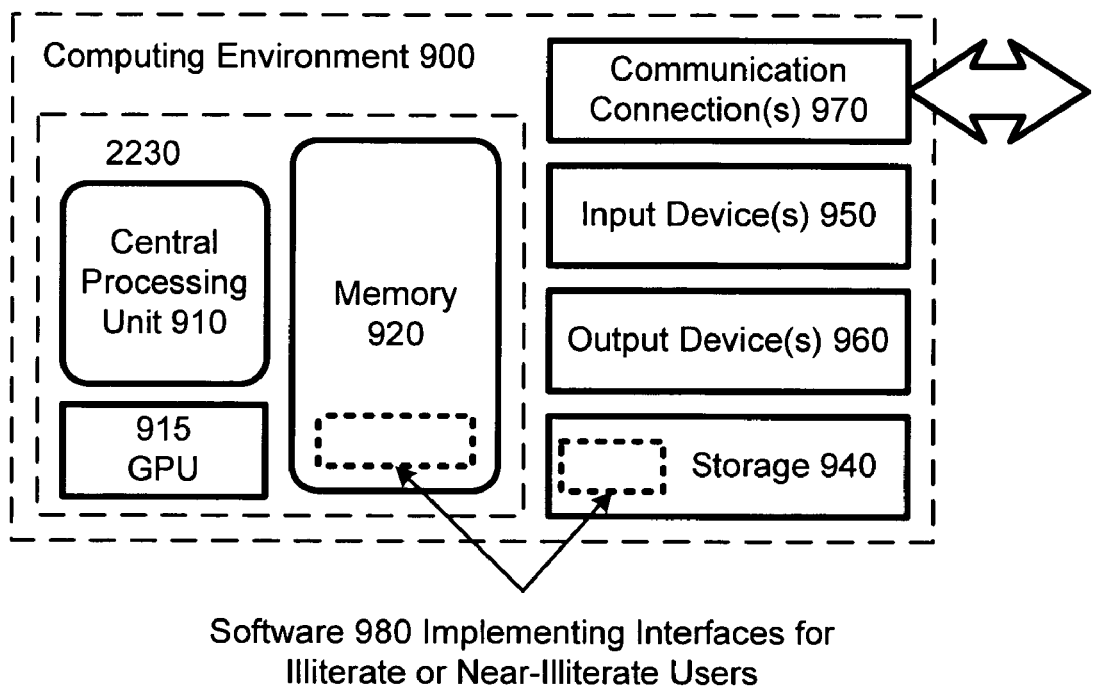
FIG. 9 is a block diagram of a suitable computing environment in conjunction with which described embodiments may be implemented.

FIG. 9 and the following discussion are intended to provide a brief, general description of an exemplary computing environment in which the disclosed technology may be implemented. For instance, any of the functionalities described with respect to interfaces elements, such as those shown in FIGS. 1, 2, and 3 can be implemented in such a computing environment. Although not required, the disclosed technology was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

FIG. 9 illustrates a generalized example of a suitable computing environment 900 in which described embodiments may be implemented. The computing environment 900 is not intended to suggest any limitation as to scope of use or functionality of the invention, as the present invention may be implemented in diverse general-purpose or special-purpose computing environments.

With reference to FIG. 9, the computing environment 900 includes at least one central processing unit 910 and memory 920. In FIG. 9, this most basic configuration 930 is included within a dashed line. The central processing unit 910 executes computer-executable instructions and may be a real or a virtual processor. The environment 900 further includes the graphics processing unit GPU at 915 for executing such computer graphics operations as vertex mapping, pixel processing, rendering, and texture mapping. In a multi-processing system, multiple processing units execute computer-executable instructions to increase processing power and as such the GPU and CPU can be running simultaneously. The memory 920 may be volatile memory (e.g., registers, cache, RAM), non-volatile memory (e.g., ROM, EEPROM, flash memory, etc.), or some combination of the two. The memory 920 stores software 980 implementing the described methods of providing computer-novice graphical user interfaces and elements. A computing environment may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other medium which can be used to store information and which can be accessed within the computing environment 900. The storage 940 stores instructions for the software 980 implementing methods of implementing the disclosed technology.

The input device(s) 950 may be a touch input device such as a keyboard, mouse, pen, or trackball, a voice input device, a scanning device, touchscreen, or another device that provides input to the computing environment 900. For audio, the input device(s) 950 may be a sound card or similar device that accepts audio input in analog or digital form, or a CD-ROM reader that provides audio samples to the computing environment. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, compressed graphics information, or other data in a modulated data signal. These connections may include network connections, which may be wireless connections, may include dial-up connections, and so on.

Computer-readable media are any available tangible media that can be accessed within a computing environment. By way of example, and not limitation, with the computing environment 900, computer-readable media include memory 920, storage 940, communication media, and combinations of any of the above.

Having described and illustrated the principles of our technology with reference to the illustrated embodiments, it will be recognized that the illustrated embodiments can be modified in arrangement and detail without departing from such principles.

Elements of the illustrated embodiment shown in software may be implemented in hardware and vice-versa. Also, the technologies from any example can be combined with the technologies described in any one or more of the other examples. Also, the flow charts are all exemplary and various actions within them can occur in other orders or may be deleted altogether. For example, in FIG. 4B, the process block 432B is optional.

In view of the many possible embodiments to which the principles of the technology may be applied, it should be recognized that the illustrated embodiments are examples and should not be taken as a limitation on the scope of the various embodiments. For instance, various components of systems and tools described herein may be combined in function and use. We, therefore, claim as all subject matter that comes within the scope and spirit of these claims.

We claim:

1. A computer-readable storage medium having encoded thereon computer-executable instructions for performing a computer-implemented method of displaying a computer-generated graphical user interface for locating jobs by users with limited reading skills, the method comprising:
   presenting, by a computer, a basic job information screen displaying job information for a particular geographical area selected by a prospective employee user, wherein the basic job information screen displaying job information comprises basic information for a plurality of jobs, wherein the basic information comprises clock icons indicating starting times for respective of the plurality of jobs and icons representing action activities of the respective jobs, and wherein a given job out of the plurality of jobs is selectable by the prospective employee user; and
   presenting, by the computer, a detailed job information screen displayed responsive to selection of the given job, wherein the detailed job information screen comprises:
   a clock icon indicating a starting time for the given job;
   a clock icon indicating an ending time for the given job;
   pictures of currency indicating payment for performing the given job; and
   icons indicating action activities for respective individual portions of the given job.

2. The computer-readable storage medium of claim 1 wherein the graphical user interface comprises:
   a plurality of controls operable to be displayed on one or more of a plurality of pages, wherein each control is represented by an icon comprising an image, and each control has a related control help message, each control operationally able to respond with the control help message upon activation, wherein the control help message is an audio message or a video message that activates on mouse over.

3. The computer-readable storage medium of claim 1, wherein the graphical user interface comprises:
   a page help feature, wherein the page help feature appears at a location on a page and at a same location on a plurality of other pages, wherein the graphical user interface is associated with an application, and wherein the page help feature is configured to explain at least one selected from the group consisting of: purpose of the application, purpose of the page the page help feature is on, use of an input device associated with the application, interaction with the computer, and function of at least some controls displayed on the page.

4. The computer-readable storage medium of claim 3, wherein the page help feature explains via an explanation comprising at least one of recorded audio, synthesized audio, recorded video, or animation.

5. The computer-readable storage medium of claim 3, wherein the graphical user interface comprises:
   a virtual character, the virtual character representing the page help feature.

6. The computer-readable storage medium of claim 4, wherein the page help feature shows how users can navigate through the graphical user interface.

7. The computer-readable storage medium of claim 3, wherein the graphical user interface comprises:
at least two language controls, each language control associated with a different human language, the page help feature having a help language, the language controls operationally able to set the help language to the human language associated with the language control when one of the language controls is selected by the prospective employee user.

8. The computer-readable storage medium of claim 1, wherein the graphical user interface comprises:
an incremental text displayer, operationally able to allow levels of text to be displayed when a predefined criterion is met.

9. A computer-implemented method of providing a graphical user map interface, the interface comprising a plurality of textless pages, the textless pages comprising a plurality of controls, a help control on each of the plurality of textless pages, the help control substantially at a same location on the textless pages and having no text associated with it, comprising:
receiving input that a first control on a first page has been selected, the first control having a function, a graphical representation of the first control comprising a picture which represents the function and which has no text associated with it;
receiving input that the first control on the first page has been help selected; and, in response, playing a message about the first control, the message comprising a voice message or an audio message; wherein help selection comprises hovering an input device over the first control for a predefined period of time;
receiving input that a search criterion selection icon has been selected, and in response, performing a search associated with the search criterion selection icon, wherein the search criterion comprises jobs located in an indicated geographical area selected by a prospective employee user; and
displaying ordered results returned from the search on a basic job information screen displaying job information for the indicated geographical area selected by the prospective employee user, wherein the basic job information screen displaying job information comprises basic information for a plurality of jobs, wherein the basic information comprises clock icons indicating starting times for respective of the plurality of jobs and icons representing action activities of the respective jobs, and wherein a given job out of the plurality of jobs is selectable by the prospective employee user;
a detailed job information screen displayed responsive to selection of the given job, wherein the detailed job information screen comprises:
a clock icon indicating a starting time for the liven job;
a clock icon indicating an ending time for the liven job;
pictures of currency indicating payment for performing the given job; and icons indicating action activities for respective individual portions of the given job.

10. The method of claim 9, wherein the interface further comprises a rotational control, wherein the rotational control comprises at least one rotational arrow, the rotational arrow associated with a rotation direction, and wherein the method further comprises rotating a map in the rotation direction associated with the rotational arrow when input is received that the rotational arrow has been selected.

11. The method of claim 9, wherein the interface comprises at least one control allowing a user to select one of at least two languages with different ordering conventions, and wherein the ordered results are ordered using directional conventions of the selected language.

12. A tangible computer-readable storage medium storing computer-executable instructions for causing a computer system to perform the method of claim 9.

13. The method of claim 9 further comprising ordering the results returned from the search by distance, and highlighting a search result closest to the prospective employee user.

14. The method of claim 9, further comprising receiving input that a second search criterion selection icon has been selected, and in response, performing a search according to the search criterion selection icon and the second search criterion selection icon.

15. The computer-readable storage medium of claim 1, wherein the method further comprises:
on the detailed job information screen, displaying an icon of representing an address of an employer for the given job; and
responsive to selection of the icon representing the address of the employer for the given job, playing a voice of the address of the employer.

16. The computer-readable storage medium of claim 1, wherein:
at least one of the clock icons indicates morning via a displayed sun; and
at least one of the clock icons indicates evening via a displayed moon.

17. The computer-readable storage medium of claim 16, wherein the method further comprises:
on the detailed job information screen, displaying an arrow that indicates a direction to be read for the clock icon indicating the starting time and the clock icon indicating the ending time.

18. A computer programmed with computer-executable instructions for performing a method comprising:
presenting a map divided into a plurality of shapes representing respective geographical areas within a target location;
responsive to selection of a given geographical area on the map by a user, presenting a basic job information screen displaying job information for the given geographical area selected by the user, wherein the basic job information screen displays job information comprising basic information for a plurality of jobs, wherein the basic information comprises clock icons indicating starting times for respective of the plurality of jobs and icons representing action activities of the respective jobs, and wherein a given job out of the plurality of jobs is selectable by the user;
a detailed job information screen displayed responsive to selection of the given job, wherein the detailed job information screen comprises (a)-(e):
(a) a clock icon indicating a starting time for the given job;
(b) a clock icon indicating an ending time for the given job;
(c) pictures of currency indicating payment for performing the given job;
(d) icons indicating action activities for respective individual portions of the given job; and
(e) icons indicating rooms in a house in which respective of the action activities are to be performed as part of the given job.

* * * * *